(12) United States Patent
Ollila (10) Patent No.: US 12,423,783 B2
(45) Date of Patent: Sep. 23, 2025

(54) DIFFERENTLY CORRECTING IMAGES FOR DIFFERENT EYES

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 440 days.

(21) Appl. No.: 17/886,664

(22) Filed: Aug. 12, 2022

(65) Prior Publication Data

US 2024/0054619 A1 Feb. 15, 2024

(51) Int. Cl.
*G06T 5/73* (2024.01)
*G06T 5/60* (2024.01)
*G06T 5/77* (2024.01)

(52) U.S. Cl.
CPC ............. *G06T 5/73* (2024.01); *G06T 5/77* (2024.01); *G06T 2207/20201* (2013.01); *G06T 2207/30168* (2013.01)

(58) Field of Classification Search
CPC ... G06T 5/50; G06T 5/73; G06T 2207/20201; G06T 7/55; G06T 5/70; G06T 5/77; G06T 2207/30168; G06T 2207/10021; G06T 2207/20084; G06T 5/60; G06T 5/90; G06T 2207/20081; G06T 2207/10012; H04N 13/25; H04N 13/128; H04N 13/383
See application file for complete search history.

(56) References Cited

U.S. PATENT DOCUMENTS

| | | | |
|---|---|---|---|
| 11,037,359 B1 * | 6/2021 | Bleyer | H04N 13/128 |
| 11,056,030 B1 | 7/2021 | Melakari et al. | |
| 11,611,699 B2 * | 3/2023 | Adsumilli | H04N 23/90 |
| 2014/0362446 A1 * | 12/2014 | Bickerstaff | G02B 27/0093 |
| | | | 359/630 |
| 2021/0063746 A1 * | 3/2021 | Aiki | G02B 27/017 |
| 2021/0082088 A1 * | 3/2021 | Kikukawa | H04N 13/383 |

OTHER PUBLICATIONS

Doutre, C., & Nasiopoulos, P. (2009). Correcting sharpness variations in Stereo Image pairs | IEEE conference publication | IEEE Xplore. https://ieeexplore.ieee.org/document/5430078/ (Year: 2009).*
Anwar, S., Khan, S., & Barnes, N. (Mar. 23, 2020). A deep journey into super-resolution: A survey. arXiv.org. https://arxiv.org/abs/1904.07523 (Year: 2020).*

(Continued)

*Primary Examiner* — Gregory A Morse
*Assistant Examiner* — David Alexander Wambst
(74) *Attorney, Agent, or Firm* — ZIEGLER IP LAW GROUP, LLC.

(57) ABSTRACT

An imaging system including: a first camera and a second camera corresponding to a first eye and a second eye of a user, respectively; and processor(s) configured to: control the first camera and the second camera to capture a sequence of first images and a sequence of second images, respectively; and apply motion blur correction to one of a given first image and a given second image, whilst applying at least one of: defocus blur correction, image sharpening, contrast enhancement, edge enhancement to another of the given first image and the given second image.

19 Claims, 2 Drawing Sheets

(56) References Cited

OTHER PUBLICATIONS

Frye, M. (May 17, 2020). Blurry photos? camera movement, lens diffraction, using a tripod, focus. Michael Frye Photography. https://www.michaelfrye.com/2018/10/31/five-causes-of-blurry-photos/ (Year: 2020).*

Hillaire, S., Anatole Lécuyer, Rémi Cozot, & Géry Casiez. (2008). Using an Eye-Tracking System to Improve Camera Motions and Depth-of-Field Blur Effects in Virtual Environments. IEEE Virtual Reality Conference. https://doi.org/10.1109/vr.2008.4480749 (Year: 2008).*

Park, J.-H., & Kim, S.-B. (2018). Optical see-through holographic near-eye-display with eyebox steering and depth of field control. Optics Express, 26(21), 27076. https://doi.org/10.1364/oe.26.027076 (Year: 2018).*

Meng, X., Du, R., & Varshney, A. (2020). Eye-dominance-guided Foveated Rendering. IEEE Transactions on Visualization and Computer Graphics, 26(5), 1972-1980. https://doi.org/10.1109/tvcg.2020.2973442 (Year: 2020).*

Buemi et al, "Adaptive Sharpening with Overshoot Control", Image Analysis and Processing (ICIAP), Lecture Notes in Computer Science, pp. 863-872, 2009.

Chen et al, "Blind Image Deblurring with Local Maximum Gradient Prior", 2019 IEEE/CVF Conference on Computer Vision and Pattern Recognition (CVPR), pp. 1742-1750, 2019.

Huang et al., "Efficient Contrast Enhancement using Adaptive Gamma Correction with Weighting Distribution" IEEE Transactions on Image Processing, vol. 22, Issue 3, Oct. 2012, pp. 1032-1041.

Pan et al, "Blind Image Deblurring Using Dark Channel Prior" 2016 IEEE Conference on Computer Vision and Pattern Recognition (CVPR), pp. 1628-1636, 2016.

Patel et al, "A Survey on Different Image Deblurring Techniques", International Journal of Computer Applications, vol. 16, Issue 13, Apr. 2015.

Tan et al, CodedStereo: Learned Phases Masks for Large Depth-of-field Stereo: 2021 IEEE/CVF Conference on Computer Vision and Pattern Recognition (CVPR), pp. 7170-7179, Nov. 2021.

Tan et al, "EDoF-ToF: extended depth of field time-of-flight imaging" Optics Express, vol. 29, Issue 23, pp. 38540-38556, Nov. 2021.

Tao et al, "Adaptive and Integrated Neighborhood-Dependent Approach for Non-linear Enhancement of Color Images", Journal of Electronic Imaging, vol. 14, No. 4, Oct. 2005.

Tao et al., "Scale-recurrent Network for Deep Image Deblurring", 2018 IEEE/CVF Conference on Computer Vision and Pattern Recognition, pp. 8174-8182.

* cited by examiner

DIFFERENTLY CORRECTING IMAGES FOR DIFFERENT EYES

TECHNICAL FIELD

The present disclosure relates to imaging systems incorporating different image corrections for different eyes. The present disclosure also relates to methods incorporating different image corrections for different eyes. The present disclosure further relates to display apparatuses incorporating different image corrections for different eyes.

BACKGROUND

Nowadays, with increase in number of images being captured every day, there is an increased demand for image processing, specifically for image enhancement. Such a demand may, for example, be quite high and critical in case of evolving technologies such as immersive extended-reality (XR) technologies, which are being employed in various fields such as entertainment, real estate, training, medical imaging operations, simulators, navigation, and the like. Such immersive XR technologies create XR environments for presentation to users of XR devices (such as XR headsets, pairs of XR glasses, or similar).

As the captured images are extremely prone to introduction of various types of visual artifacts such as blur, noise, or similar therein, such images are generally not used directly to create the XR environments. Moreover, such visual artifacts also adversely affect image aesthetics, which is undesirable when creating the XR environments.

However, existing equipment and techniques for correcting images are inefficient in terms of employing proper image correction operation(s) based on a particular type of visual artifact (such as blur) or its extent present in the image. For example, when motion blur correction is applied to correct an image in which motion blur is negligible or is absent entirely, visual quality of such an image degrades more than that when the motion correction is not applied to the image. Such an image may, for example, lose some visual information due to a static real-world scene captured in the image and/or due to a steady camera or photographer. On the other hand, when the motion blur is considerable in the image, it would be a waste of processing resources for also applying denoising on the image. Secondly, some existing equipment and techniques are not well-suited for switching between different image correction operation(s) when a certain criterion or threshold is not favorable. For example, when an image has a heavy motion blur, an existing image correction operation needs to be changed from denoising to motion blur correction. Thirdly, image correction techniques are often processing resource intensive and time-consuming. Thus, implementation of the image correction techniques is generally expensive. Moreover, some existing equipment and techniques employ machine learning (ML)-based (for example, such as neural network-based) image correction operation(s) which are only able to provide a very limited accuracy.

Therefore, in light of the foregoing discussion, there exists a need to overcome the aforementioned drawbacks associated with existing equipment and techniques for correcting images.

SUMMARY

The present disclosure seeks to provide an imaging system incorporating different image corrections for different eyes. The present disclosure also seeks to provide a method incorporating different image corrections for different eyes. The present disclosure further relates to a display apparatus incorporating different image corrections for different eyes. An aim of the present disclosure is to provide a solution that overcomes at least partially the problems encountered in prior art.

In a first aspect, an embodiment of the present disclosure provides an imaging system comprising:
- a first camera and a second camera corresponding to a first eye and a second eye of a user, respectively; and
- at least one processor configured to:
  - control the first camera and the second camera to capture a sequence of first images and a sequence of second images, respectively; and
  - apply motion blur correction to one of a given first image and a given second image, whilst applying at least one of: defocus blur correction, image sharpening, contrast enhancement, edge enhancement to another of the given first image and the given second image.

In a second aspect, an embodiment of the present disclosure provides a method comprising:
- controlling a first camera and a second camera to capture a sequence of first images and a sequence of second images, respectively, wherein the first camera and the second camera correspond to a first eye and a second eye of a user, respectively; and
- applying motion blur correction to one of a given first image and a given second image, whilst applying at least one of: defocus blur correction, image sharpening, contrast enhancement, edge enhancement to another of the given first image and the given second image.

In a third aspect, an embodiment of the present disclosure provides a display apparatus implementing the imaging system of the aforementioned first aspect, comprising at least one first light source and at least one second light source corresponding to the first eye and the second eye, respectively, wherein the at least one processor is configured to display the given first image and the given second image, via the at least one first light source and the at least one second light source, respectively.

Embodiments of the present disclosure substantially eliminate or at least partially address the aforementioned problems in the prior art, and enable reliable, resource-efficient and time-efficient correction of images for displaying at the display apparatus, in real time or near-time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:
 a first camera and a second camera corresponding to a first eye and a second eye of a user, respectively; and
 at least one processor configured to:
  control the first camera and the second camera to capture a sequence of first images and a sequence of second images, respectively; and
  apply motion blur correction to one of a given first image and a given second image, whilst applying at least one of: defocus blur correction, image sharpening, contrast enhancement, edge enhancement to another of the given first image and the given second image.

In a second aspect, an embodiment of the present disclosure provides a method comprising:
 controlling a first camera and a second camera to capture a sequence of first images and a sequence of second images, respectively, wherein the first camera and the second camera correspond to a first eye and a second eye of a user, respectively; and
 applying motion blur correction to one of a given first image and a given second image, whilst applying at least one of: defocus blur correction, image sharpening, contrast enhancement, edge enhancement to another of the given first image and the given second image.

In a third aspect, an embodiment of the present disclosure provides a display apparatus implementing the imaging system of the aforementioned first aspect, comprising at least one first light source and at least one second light source corresponding to the first eye and the second eye, respectively, wherein the at least one processor is configured to display the given first image and the given second image, via the at least one first light source and the at least one second light source, respectively.

The present disclosure provides the aforementioned imaging system, the aforementioned method, and the aforementioned display apparatus incorporating different image corrections for different eyes. Herein, the motion blur correction and the at least one of: defocus blur correction, image sharpening, contrast enhancement, edge enhancement are applied in the aforesaid manner to a sequence of stereo image pairs (namely, the sequence of first images and the sequence of second images). The imaging system enables in minimizing processing resource utilization and processing time of the at least one processor, without compromising on the user's viewing experience, because the motion blur correction (which is generally a computationally intensive operation) is only applied to a single image in a stereo image pair (namely, to the one of the given first image and the given second image). For the another of the given first image and the given second image, switching can be performed between various restorations (namely, the at least one of: defocus blur correction, image sharpening, contrast enhancement, edge enhancement) without affecting the contrast of image. Also, these different types of corrections are applied in the aforesaid manner for each stereo image pair, without requiring fulfilment of any criterion or threshold for checking when to apply a particular correction. The method is simple, robust, fast, reliable and can be implemented with ease.

Furthermore, although only one image (out of the given first image and the given second image) is selected for applying the motion blur correction, irrespective of whether or not said image has motion blur, and a remaining image is selected for applying the at least one of: defocus blur correction, image sharpening, contrast enhancement, edge enhancement, an overall visual quality achieved by a combined view of the given first image and the given second image (upon such correction) is very high. Notably, human binocular vision fuses the given first image and the given second image into one, such that human brain picks up a better contrasted image from amongst the given first image and the given second image. In a case where there is motion blur in both the given first image and the given second image, the one of the given first image and the given second image (to which the motion blur correction is applied) has a high visual quality, while the another of the given first image and the given second image does not have such a high visual quality. As a result, the user perceives a high visual quality in the given first image and the given second image, when displayed to her/him, even when only one of the images has the high visual quality. In another case where there is no motion blur in the given first image and the given second image, the one of the given first image and the given second image (to which the motion blur correction is applied) has a lower visual quality as compared to the another of the given first image and the given second image. However, the user perceives an acceptably high visual quality in the given first image and the given second image, when displayed to her/him, even when the one of the given first image and the given second image has a lower visual quality as compared to the another of the given first image and the given second image. In this manner, the images displayed by the display apparatus are perceived by the user to have high visual quality, whilst reducing a need to apply heavy image processing (namely, the motion blur correction) to the another of the given first image and the given second image. Moreover, it will be appreciated that the aforesaid images are corrected by the at least one processor in real time or near-real time (i.e., without any latency/delay).

Notably, the at least one processor controls an overall operation of the imaging system. The at least one processor is communicably coupled to at least the first camera and the second camera wirelessly and/or in a wired manner.

Throughout the present disclosure, the term "camera" refers to an equipment that is operable to detect and process light signals received from a real-world environment, so as to capture image(s) of the real-world environment. Optionally, a given camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, a given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given camera may be implemented as the stereo camera.

Throughout the present disclosure, the term "image" refers to a visual representation of the real-world environment, which encompasses not only colour information represented in the image, but also other attributes associated with the image (for example, such as depth information, transparency information, luminance information, brightness information, and the like). It will be appreciated that the given first image and the given second image are captured simultaneously (namely, at a same time), via the first camera and the second camera, respectively. The given first image is captured with respect to a perspective of the first eye of the user, while the given second image is captured with respect to a perspective of the second eye of the user. The given first image and the given second image constitute a stereo image pair for the user's eyes. The stereo image pair represents a given scene of the real-world environment in a 3D realistic manner.

Throughout the present disclosure, the term "display apparatus" refers to a specialized equipment that is capable of at least correcting and displaying images. These images are to be presented to the user of the display apparatus. Optionally, the display apparatus is implemented as a head-mounted display (HMD) device. The term "head-mounted display" refers to specialized equipment that is configured to present an XR environment to the user when said HMD device, in operation, is worn by the user on his/her head. The HMD device is implemented, for example, as an XR headset, a pair of XR glasses, and the like, that is operable to display a visual scene of the XR environment to the user. Upon correction, the images are utilized for generating the visual scene of the XR environment. The term "extended-reality" encompasses virtual reality (VR), augmented reality (AR), mixed reality (MR), and the like.

Optionally, the given camera is arranged on the display apparatus worn by the user on his/her head, wherein the given camera is aligned to capture a given image from a perspective of a given eye of the user. Optionally, in this regard, the first camera and the second camera are arranged to face the real-world environment in a manner that a distance between them is equal to an interpupillary distance (IPD) between the first eye and the second eye of the user.

In some implementations, the imaging system is integrated with the display apparatus. In such implementations, all components of the imaging system are physically coupled to the display apparatus (for example, attached via mechanical and/or electrical connections to components of the display apparatus). Optionally, in such implementations, the at least one processor of the imaging system serves as the at least one processor of the display apparatus. Alternatively, optionally, in such implementations, the at least one processor of the imaging system is communicably coupled to the at least one processor of the display apparatus.

In other implementations, at least one component (such as the first camera and the second camera) of the imaging system is implemented on a remote device that is separate from the display apparatus. In such implementations, the at least one processor of the imaging system and the at least one processor of the display apparatus are communicably coupled, wirelessly and/or in a wired manner. Examples of the remote device include, but are not limited to, a computer, a teleport device, a drone, a vehicle, and a robot.

It will also be appreciated that the term "motion blur" refers to a visual anomaly representing an apparent streaking (for example, in a form of blurring) of moving/stationary object(s) of the real-world environment in a given image upon capturing of the given image. Movement of such object(s) can be referred to as a local motion of the object(s). The motion blur could occur when the given image is captured whilst a head of the user is moving or shaking (when the cameras are mounted on an HMD worn by the user) and/or whilst a given camera is moving or shaking (namely, a global motion of the given camera). Furthermore, the term "defocus blur" refers to a visual anomaly representing a loss of sharpness of object(s) of the real-world environment in a given image upon capturing of the given image. In other words, the object(s) represented in a given region of the given image appear(s) to be out of focus (namely, blurred), due to the defocus blur. The defocus blur may occur due to improper focusing of a camera, or due to a defective optical element (such as a lens) of the camera. The aforesaid terms are well-known in the art.

It will be appreciated that when motion blur occurs, it often occurs together in both the given first image and the given second image, because both the first camera and the second camera are mounted on a same base structure. However, defocus blur could occur in one or both of the first camera and the second camera. Optionally, in this regard, when one of the first camera and the second camera is not known to cause defocus blur during image capturing, while another of the first camera and the second camera is known to cause defocus blur repeatedly during image capturing, the at least one processor is configured to select a given image captured by the another of the first camera and the second camera as the another of the given first image and the given second image, for applying the defocus blur correction.

Pursuant to embodiments of the present disclosure, different types of corrections (namely, the motion blur correction and the at least one of: defocus blur correction, image sharpening, contrast enhancement, edge enhancement) could be applied easily and repeatedly for the sequence of first images and the sequence of second images without requiring fulfilment of any criterion or threshold. It is to be noted here that some existing techniques for correcting images employ a combination of noise correction and defocus blur correction. However, such a combination is not effective and reliable due to binocular rivalry, as even after fusion of images upon correction, the human vision system is still able to see peripheral noise in a combined view of such images.

Optionally, when applying the motion blur correction to a given image, the at least one processor is configured to employ at least one motion blur correction technique. Furthermore, optionally, when applying the defocus blur correction to a given image, the at least one processor is configured to employ at least one defocus blur correction technique. It will be appreciated that the at least one motion blur correction technique and/or the at least one defocus blur correction technique may be based on one of: blind image deconvolution, non-blind image deconvolution. A blind image deconvolution technique may utilize a blur kernel that may be estimated based on a regularisation. A non-blind image deconvolution technique utilizes a point spread function (PSF) for image restoration. The at least one motion blur correction technique and/or the at least one defocus blur correction technique may employ at least one of: a restoration filter based on deconvolving with a wiener filter, a constrained least-squares image restoration filter, a Lucy-Richardson deconvolution algorithm, an artificial neural network (ANN)-based image restoration algorithm. The at least one motion blur correction technique may employ a BF-WGAN algorithm that combines a bilateral filtering (BF) denoising theory with a Wasserstein generative adversarial network (WGAN) for the motion blur correction. Techniques for the motion blur correction and the defocus blur correction are well-known in the art. It will be appreciated that the at least one processor may employ a narrow neural network (for defocus blur correction) that is suitable for correcting images defocussed at a narrow focus range, for example, lying between 50 centimetres to 100 centimetres. Such a narrow neural network would be required to be trained with images that are defocused in the narrow focus range. As a result, such a narrow neural network is cost-effective and accurate, and has negligible latency, as compared to large neural networks that are trained using very wide image sets having all possible focus distances.

Further, the term "image sharpening" refers to an image processing technique for increasing an apparent sharpness of (a visual content represented in) a given image. Optionally, when applying the image sharpening to the given image, the at least one processor is configured to employ at least one image sharpening technique. The at least one image sharpening technique may, for example, be an unsharp masking (UM) technique, a wavelet transform-based image sharpening technique, or similar. Moreover, various ringing control techniques may also be applied along with the image sharpening for reducing noise amplification in the given image. Also, various edge-preserving filters (such as a bilateral filter, a guided filter, or similar) may be used in a similar way as a Gaussian blur filter in the UM technique. The UM technique is described, for example, in "*Adaptive Sharpening with Overshoot Control*" by Antonio Buemi et al., published in Image Analysis and Processing (ICIAP), Lecture Notes in Computer Science, pp. 863-872, 2009, which has been incorporated herein by reference.

The term "contrast enhancement" refers to an image processing technique for adjusting a relative brightness and darkness of object(s) in a visual scene represented by a given image, in order to improve visibility of such object(s). Optionally, when applying the contrast enhancement to the given image, the at least one processor is configured to employ at least one contrast enhancement technique. The at least one contrast enhancement technique may, for example, be a histogram equalization technique, a gamma correction technique, a histogram stretching technique, a histogram shrinking technique, a tone-mapping technique, a high dynamic range (HDR) tone-mapping technique, or similar. Few such techniques are described, for example, in "*Adaptive and Integrated Neighborhood-Dependent Approach for Nonlinear Enhancement of Color Images*" by Li Tao and Vijayan K. Asari, published in Journal of Electronic Imaging, Vol. 14, No. 4, October 2005, and in "*Efficient Contrast Enhancement using Adaptive Gamma Correction with Weighting Distribution*" by Shih-Chia Huang, Fan-Chieh Cheng, and Yi-Sheng Chiu, published in IEEE Transactions on Image Processing, Vol. 22, Issue 3, pp. 1032-1041, October 2012, which have been incorporated herein by reference. In an example implementation of applying the contrast enhancement to the given image, different exposure time could be used (as compared to the one of the given first image and the given second image). As an example, a shorter exposure time could be used as compared to an exposure time used for capturing the one of the given first image and the given second image, to avoid over exposure of bright areas in the another of the given first image and the given second image.

The term "edge enhancement" refers to an image processing technique for enhancing an edge contrast of features represented in a given image in order to improve an acutance of the given image. Optionally, when applying the edge enhancement to the given image, the at least one processor is configured to employ at least one edge enhancement technique. The at least one edge enhancement technique may, for example, be a linear edge enhancement technique, a non-linear edge enhancement technique, or similar. The edge enhancement may also facilitate in attenuation of noise in a gaze-contingent region of the given image, and thus a high visual quality is achieved for such a region.

It will be appreciated that the at least one edge enhancement technique targets to modify edges in the given image utilizing various edge detection filters and their directional variants. A modification in such a technique may include, ringing modification, an edge width by embossing, techniques which only impact contrast on edges, or similar. In an example, an emboss filter (namely, a directional difference filter) may enhance the edges in a direction of selected convolution mask(s). When the emboss filter is applied, a filter matrix is in convolution calculation with a same square area as that on the (original) given image.

It will also be appreciated that all the aforementioned operations (namely, the motion blur correction, the defocus blur correction, the image sharpening, the contrast enhancement, and the edge enhancement) could be divided into two categories, wherein operation(s) of a first category may be applied (by the at least one processor) to a given image, whereas operation(s) of a second category may be applied (by the at least one processor) to a remaining image. In this regard, the first category relates to a macro level error correction of an image, and thus comprises heavy processing operations, for example, such as the motion blur correction, and a defocus blur correction for correcting defocus blur due to a depth of field of a camera lens. These operations may be applied using a large blur kernel, for example, lying in a range from a 20×20 grid of pixels to a 150×150 grid of pixels. A blur kernel of motion blur could be a line (straight or curved) representing a trajectory of motion, while a blur kernel of defocus blur could be disc-like (symmetric or asymmetric about a central axis). In other words, motion blur is directional (namely, depending on the direction of motion), while defocus blur is more consistent in all the directions.

Furthermore, the second category relates to a micro level error correction of an image (i.e., a fine tuning of the image), and thus comprises light processing operations, for example, such as a defocus blur correction for correcting defocus blur due to bad optics quality, the image sharpening, the contrast enhancement, the edge enhancement, and optionally a super-resolution technique. These operations could be applied using a small blur kernel, for example, lying in a range from a 5×5 grid of pixels to a 15×15 grid of pixels.

Optionally, the at least one processor is configured to:
obtain information indicative of a dominant eye of the user or determine the dominant eye from amongst the first eye and the second eye;
determine an optical depth at which the user is looking; and
when the optical depth is greater than a predefined threshold depth and a given camera that captured the one of the given first image and the given second image corresponds to the dominant eye of the user, apply the motion blur correction to the one of the given first image and the given second image.

In some implementations, the information indicative of the dominant eye is pre-determined and pre-stored for the user, at a data repository that is communicably coupled to the at least one processor. In such a case, the at least one processor is configured to obtain the information indicative of the dominant eye from the data repository. Such a data repository may be implemented as a memory of the imaging system, a removable memory, a cloud-based database, or similar. Optionally, the information indicative of the dominant eye is pre-determined by an ophthalmologist. In a such case, the ophthalmologist conducts at least one eye test for the user's eyes to generate the information indicative of the dominant eye, wherein said information comprises eye-testing data. Optionally, the information indicative of the dominant eye is communicated from a device associated with the ophthalmologist or the user, to the data repository, wherein the device associated with the ophthalmologist or the user is communicably coupled to the data repository. Examples of such a device include, but are not limited to, a computer, a laptop, a smartphone, and a tablet. It will be appreciated that the data repository is optionally used to store information indicative of dominant eye for a plurality of users. The at least one processor could also obtain the information pertaining to the dominant eye directly from the user, prior to, or at a start of a given session of using the imaging system (or the display apparatus).

In other implementations, the at least one processor is configured to determine the dominant eye during an initial calibration of the display apparatus according to the user's eyes. In such a case, gaze-tracking means of the display apparatus is employed to generate gaze-tracking data for the user's eyes during the initial calibration of the display apparatus. Optionally, in this regard, the gaze-tracking means is employed to collect the gaze-tracking data of both eyes of the user, when the user views at least one reference image during the initial calibration. Herein, the term "reference image" refers to an image that is to be used for calibrating the display apparatus according to the user's eyes. Optionally, in this regard, the at least one reference image presents to the user a given visual target at a given location and a given optical depth. The term "visual target" refers to a visible mark (namely, spot) represented within the at least one reference image. Notably, the given visual target is distinctly visible in the at least one reference image. Optionally, in the at least one reference image, the given visual target may be represented at a central portion, a corner portion, a top portion, a right side portion, and the like, of a field of view of the user. Since the at least one processor controls displaying of the at least one reference image, the given location and the given optical depth of the given visual target are already known to the at least one processor. In this regard, the at least one processor is configured to determine expected gaze directions of the user's eyes, based on the given location and the given optical depth of the given visual target. Then, the at least one processor compares the expected gaze directions of the user's eyes with determined gaze directions of the user's eyes, to determine which eye of the user acts as the dominant eye (at the given optical depth). In this regard, an eye of the user for which the expected gaze direction is substantially similar to the determined gaze direction is determined to be the dominant eye.

Optionally, when determining the optical depth at which the user is looking, the at least one processor is configured to:
obtain information indicative of a gaze direction of the user; and
determine the optical depth, based on the gaze direction and a depth map of a given scene of the real-world environment at which the user is looking.

It will be appreciated that when the user is looking towards at least one object present in the given scene of the real-world environment, the (determined) optical depth would correspond to an optical depth of the at least one object.

Optionally, the at least one processor is configured to obtain, from the gaze-tracking means, the information indicative of the gaze direction. In case of the imaging system, the at least one processor could be communicably coupled to a display apparatus comprising the gaze-tracking means. In case of the display apparatus, the gaze-tracking means could be a part of the display apparatus. The term "gaze-tracking means" refers to a specialized equipment for detecting and/or following gaze of a given eye of the user. The term "gaze direction" refers to a direction in which the given eye of the user is gazing. The gaze direction may be indicated by a gaze vector in the aforesaid information. The gaze-tracking means could be implemented as contact lenses with sensors, cameras monitoring a position, a size and/or a shape of a pupil of the given eye of the user, and the like. Such gaze-tracking means are well-known in the art.

Further, the term "depth map" refers to a data structure comprising information pertaining to optical depths of (real-world) objects (or their portions) present in the given scene of the real-world environment. The depth map provides information pertaining to distances (namely, the optical depths) of surfaces of the objects or their portions, from a given viewpoint and a given viewing direction of the user. Optionally, the depth map is an image comprising a plurality of pixels, wherein a pixel value of each pixel indicates optical depth of its corresponding real point/region within the given scene.

Optionally, the at least one processor is configured to generate the depth map of the given scene of the real-world environment by processing depth-mapping data that is collected by depth-mapping means. In this regard, the imaging system and/or the display apparatus comprise the depth-mapping means. Optionally, in this regard, the at least one processor is configured to employ at least one data processing algorithm to process the depth-mapping data for generating the depth map of the given scene of the real-world environment. The depth-mapping data may be in form of depth images, phase images, visible-light images, or similar.

Correspondingly, requisite data processing algorithm(s) is/are employed to process the depth-mapping data.

According to one embodiment, the depth-mapping means comprises a specialized equipment that is employed to detect optical depths of objects present in the given scene. Optionally, the depth-mapping means is implemented as the first camera and the second camera. In this regard, the given camera is implemented as the visible-light camera or as the combination of the visible-light camera and the depth camera. Alternatively, optionally, the depth-mapping means is implemented as at least one depth camera. It will be appreciated that the depth map could also be generated using at least one of: depth from stereo, depth from focus, depth from reflectance, depth from shading, when the given camera has at least one of: a coded aperture, a sensor chip having phase detection autofocus (PDAF) pixels, a sensor chip in which some of its pixels are IR pixels. Such IR pixels can detect, for example, a structured light at an active-IR illumination.

According to an alternative or additional embodiment, the depth-mapping means is implemented as the at least one processor, wherein the at least one processor is configured to utilise a 3D environment model of the real-world environment to generate the depth map of the given scene of the real-world environment from a perspective of a pose of the given camera. The "three-dimensional environment model" is a data structure that comprises comprehensive information pertaining to a 3D space of the real-world environment. The 3D environment model may be in a form of a 3D polygonal mesh, a 3D point cloud, a 3D surface cloud, a 3D surflet cloud, a 3D grid, or similar. In this regard, the imagining system and/or the display apparatus optionally comprise a pose-tracking means that is employed to detect and/or follow the pose of the given camera in the 3D space of the real-world environment. The pose-tracking means may employ an outside-in tracking technique, an inside-out tracking technique, or a combination of both the aforesaid techniques, for collecting pose-tracking data. Such techniques are well-known in the art. The pose-tracking data may be in form of images, IMU/TIMU values, motion sensor data values, magnetic field strength values, or similar.

As mentioned earlier, optionally, when the optical depth is greater than the predefined threshold depth, the one of the given first image and the given second image is an image that has been captured by one of the first camera and the second camera that corresponds to the dominant eye of the user. Optionally, in this regard, the predefined threshold depth lies in a range of 80 centimetres to 300 centimetres. As an example, the predefined threshold depth may be from 80, 100, 120 or 150 centimetres up to 100, 125, 150, 200, 250 or 300 centimetres. It will be appreciated that when the optical depth is greater than the predefined threshold depth, the at least one object (that is represented in the one of the given first image and the given second image) corresponding to the determined optical depth can be considered to be a far object (i.e., considerably distant from the user's eyes). Therefore, the dominant eye is preferred to clearly view the at least one object that is far from the user's eyes (as compared to remaining object(s) in the given scene), as visual input of the dominant eye has higher preference. Thus, the at least one processor applies the motion blur correction to the one of the given first image and the given second image (that is captured by the given camera that corresponds to the dominant eye of the user), so that the at least one object would be clearly visible to the dominant eye of the user. In this manner, the user experiences seamless gaze-contingency and considerable realism upon viewing the (corrected) images. Beneficially, in this regard, even when the motion blur correction is applied to an image corresponding to the dominant eye of the user, an overall visual quality of a combined view of the given first image and the given second image (upon correction) is still high. Moreover, this minimizes processing resource utilization and processing time of the at least one processor, without compromising on user's viewing experience because the motion blur correction would only be applied to a single image.

It will also be appreciated that when an optical depth is not greater than the predefined threshold depth, at least one object (that is represented in any one of the given first image and the given second image) corresponding to the optical depth can be considered to be a near object (i.e., considerably closer to the user's eyes) as compared other object(s) in the real-world environment.

In an embodiment, the at least one processor is configured to:
    determine an optical depth at which the user is looking; and
    when the optical depth is not greater than a predefined threshold depth, apply the motion blur correction to any one of the given first image and the given second image randomly.

In this regard, the at least one processor randomly applies the motion blur correction to any one of the given first image and the given second image in a manner that objects that correspond to the (determined) optical depth and that are considerably closer to the user's eyes, are clearly and realistically visible in a combined view of the given first image and the given second image (upon correction). This facilitates in providing an immersive and realistic viewing experience to the user. The technical benefit of applying the motion blur correction in a random manner is that when one of the given first image and the given second image would be corrected for the motion blur, an overall visual quality of the combined view of the aforesaid images is still high, as an overall magnitude of visual artifacts present in these images would be reduced upon correction and human binocular vision fuses the given first image and the given second image into one. Moreover, this also minimizes processing resource utilization and processing time of the at least one processor without compromising on user's viewing experience, because the motion blur correction would only be applied to any one of the given first image and the given second image, without a need to check for any criterion to be satisfied.

In another embodiment, the at least one processor is configured to:
    determine an optical depth at which the user is looking; and
    when the optical depth is not greater than a predefined threshold depth, apply the motion blur correction to the sequence of first images.

In this regard, the at least one processor always applies the motion blur correction to a sequence of images corresponding to one particular eye of the user, i.e., to the sequence of first images (or the given first image). The technical benefit of applying the motion blur correction in this manner is that when only the sequence of first images would be corrected for the motion blur, user's brain may get used to (namely, habituated to) perceiving the sequence of first images (upon correction) in the combined view with a high visual quality. Moreover, upon correction of both the given first image and the given second image, an overall visual quality of the combined view would also be high, as an overall magnitude of visual artifact present in these images would be reduced upon correction and any perceivable (i.e., noticeable) disturbance or pattern due to the visual artifact in the combined view is avoided. Moreover, this also minimizes processing resource utilization and processing time of the at least one processor without compromising on user's viewing experience, because the motion blur correction would only be applied to the sequence of first images, without a need to check for any criterion to be satisfied.

In yet another embodiment, the at least one processor is configured to:
  determine an optical depth at which the user is looking; and
  when the optical depth is not greater than a predefined threshold depth, apply the motion blur correction and the at least one of: defocus blur correction, image sharpening, contrast enhancement, edge enhancement in an alternating manner to the first images and the second images.

In this regard, the at least one processor applies the motion blur correction and the at least one of: defocus blur correction, image sharpening, contrast enhancement, edge enhancement to the given first image and the given second image in a manner that for a first time instant, the motion blur correction is applied to the given first image and the at least one of: defocus blur correction, image sharpening, contrast enhancement, edge enhancement is applied to the given second image, then for a second time instant, the motion blur correction is applied to a subsequent second image and the at least one of: defocus blur correction, image sharpening, contrast enhancement, edge enhancement is applied to a subsequent first image, and so on. Beneficially, in this manner objects that correspond to the (determined) optical depth and that are considerably closer to the user's eyes, are clearly and realistically visible in combined views of the first images and the second images (upon correction). This facilitates in providing an immersive and realistic viewing experience to the user. The technical benefit of alternatingly applying the aforementioned operations is that an overall visual quality of the combined views of the aforesaid images would be high, as an overall magnitude of visual artifact present in these images would be reduced upon correction. Moreover, this also minimizes processing resource utilization and processing time of the at least one processor without compromising on user's viewing experience, because at a given time instant, the motion blur correction would only be applied to any one of the given first image and the given second image, and not to both of the aforesaid images simultaneously.

Moreover, optionally, the at least one processor is configured to:
  obtain information indicative of a dominant eye of the user or determine the dominant eye from amongst the first eye and the second eye; and
  apply the at least one of: defocus blur correction, image sharpening, contrast enhancement, edge enhancement to the one of the given first image and the given second image, when a given camera that captured the one of the given first image and the given second image corresponds to the dominant eye of the user.

In this regard, in addition to the motion blur correction, the at least one of: defocus blur correction, image sharpening, contrast enhancement, edge enhancement is applied to the one of the given first image and the given second image, when the one of the given first image and the given second image corresponds to the dominant eye of the user. Therefore, when both of the motion blur correction and the at least one of: the defocus blur correction, image sharpening, contrast enhancement, edge enhancement are applied to the aforesaid image, and only the at least one of: defocus blur correction, image sharpening, contrast enhancement, edge enhancement is applied to the another of the given first image and the given second image (corresponding to the non-dominant eye), an overall visual quality of a combined view of the given first image and the given second image (upon correction) is very high. In this manner, the user's viewing experience is enhanced, for example, such as in terms of realism and immersiveness.

Furthermore, optionally, the at least one processor is configured to employ a super-resolution technique for a given camera that captured the one of the given first image and the given second image. In this regard, the super-resolution technique is employed in addition to the motion blur correction.

Optionally, when employing the super-resolution technique, the at least one processor is configured to process the sequence of images (captured by the given camera) in a manner that gaze regions of N successive output images are generated from a gaze region of each Nth image, wherein the gaze region corresponds to the gaze direction of the user. In other words, every Nth image is used to generate the gaze regions of N successive output images. It will be appreciated that when the sequence of images is processed in the aforesaid manner, an apparent angular resolution of the gaze regions of the output images is increased by shifting (via a liquid-crystal structure of the display apparatus) a given pixel in the gaze region of each Nth image to N different positions when rendering N successive output images. When the user views the N successive output images, the user is unable to perceive this shifting in light. Instead, the user perceives an extremely high angular resolution (commonly referred to as super-resolution) of the gaze regions of the N successive output images. In this way, a spatial resolution of the gaze regions of the output images is upsampled within temporal domain.

Additionally, optionally, when employing the super-resolution technique, the at least one processor is configured to process the sequence of images (captured by the given camera) in a manner that a non-gaze region (namely, a remaining region) of a given output image is generated from a corresponding non-gaze region of a corresponding image. Optionally, in this regard, the at least one processor is configured to combine a plurality of pixels in the corresponding non-gaze region of the corresponding image to generate a given pixel in the non-gaze region of the given output image. As a result, an angular resolution of a given gaze region is higher than an angular resolution of a given non-gaze region, while a temporal resolution of the given non-gaze region is higher than a temporal resolution of the given gaze region. Resultantly, no flicker or jerk is noticeable to the user in the non-gaze regions of the output images.

Optionally, in this regard, the display apparatus further comprises a liquid-crystal device per eye, comprising the liquid-crystal structure and a control circuit, wherein the liquid-crystal structure is arranged in front of a surface of a given light source (namely, the at least one first light source or the at least one second light source), wherein the liquid-crystal structure is to be electrically controlled, via the control circuit, to shift light emanating from a given pixel of the given light source to a plurality of positions in a sequential and repeated manner. The shift in the light emanating from the given pixel to the plurality of positions causes a resolution of the output images to appear higher than a display resolution of the given light source. One such way of employing the super-resolution technique is described, for example, in U.S. Pat. No. 11,056,030B1, titled "DISPLAY APPARATUS AND METHOD OF ENHANCING APPARENT RESOLUTION USING LIQUID-CRYSTAL DEVICE" and filed on Feb. 6, 2020, which has been incorporated herein by reference.

Optionally, the at least one processor is configured to employ the super-resolution technique for another camera that captured the another of the given first image and the given second image. Alternatively, optionally, the at least one processor is configured to employ the super-resolution technique in the gaze region of the another of the given first image and the given second image only, for a given camera that captured the another of the given first image and the given second image. This greatly improves the overall visual quality of the combined view of the given first image and the given second image (when displayed), without a need to employ the super-resolution technique for an entirety of the another of the given first image and the given second image.

Moreover, optionally, the at least one processor is configured to:
compare the given first image with the given second image, after said correction is applied, to determine a difference in contrast between the given first image and the given second image; and
when the difference in contrast is lower than a predefined threshold difference, reduce an extent of the motion blur correction that is applied to the one of the given first image and the given second image, or undo application of the motion blur correction to the one of the given first image and the given second image.

The predefined threshold difference could be defined to have a fixed value, or a percentage of a maximum value of contrast. Optionally, the predefined threshold difference lies in a range of 5 percent to 25 percent of the maximum value of contrast.

Such a comparison allows to determine whether or not the motion blur has actually occurred in the given first image and the given second image, and to determine accordingly whether there is a need to apply the motion blur correction, to undo the application of the motion blur correction, or to reduce the extent of the motion blur correction. Notably, when motion blur occurs, it often occurs together in both the given first image and the given second image, because both the first camera and the second camera are mounted on the same base structure.

Therefore, when both of the given first image and the given second image actually have motion blur, but the motion blur correction is applied to the one of the given first image and the given second image only, visual quality of the one of the given first image and the given second image is much higher than visual quality of the another of the given first image and the given second image. As a result, the difference in contrast is higher (and not lower) than the predefined threshold difference, and there is no need to undo the application of the motion blur correction, or to reduce the extent of the motion blur correction. Moreover, when there is considerable motion blur in both of the given first image and the given second image, the motion blur correction is optionally also applied to the gaze region of the another of the given first image and the given second image, in addition to applying the motion blur correction to the one of the given first image and the given second image. In this manner, upon correction, the motion blur would be removed from both of the aforesaid images (more importantly from their gaze regions), thereby improving an overall visual quality of the combined view of the given first image and the given second image.

On the other hand, when none of the given first image and the given second image has any motion blur, but the motion blur correction is applied to the one of the given first image and the given second image, visual quality of the one of the given first image and the given second image may somewhat deteriorate (for example, such as in terms of contrast, super-resolution, sharpness, or similar) upon the motion blur correction. As a result, the difference in contrast may be lower than the predefined threshold difference, and there may be need to undo the application of the motion blur correction, or to reduce the extent of the motion blur correction.

Optionally, when comparing the given first image with the given second image, the at least one processor is configured to employ at least one of: a modulation transfer function (MTF)-based technique, an entropy-based technique, a focus value-based technique, a structural similarity (SSIM)-based technique.

Optionally, when the difference in contrast is not lower than the predefined threshold difference, the at least one processor is configured to apply the motion blur correction to a gaze region of the another of the given first image and the given second image also, wherein the gaze region corresponds to a gaze direction of the user. This greatly improves the visual quality that is perceivable to the user, especially in the gaze region.

Furthermore, optionally, the at least one processor is configured to warp one of the given first image and the given second image to match a perspective from which another of the given first image and the given second image is captured, prior to comparing the given first image with the given second image. In this regard, since a distance between the first camera and the second camera is equal to the IPD between the first eye and the second eye of the user, a viewpoint and a view direction of the first camera that is used to capture the given first image and a viewpoint and a view direction of the second camera that is used to capture the given second image would be (slightly) different. Resultantly, there would always be some offset/skewness between the given first image and the given second image. In such a case, the at least one processor is configured to re-project (namely, warp) the one of the given first image and the given second image to match the perspective from which the another of the given first image and the given second image is captured, according to a difference in the viewpoints and the view directions of the first camera and the second camera. Beneficially, this subsequently facilitates in accurately comparing the given first image with the given second image. Optionally, when warping the one of the given first image and the given second image, the at least one processor is configured to employ at least one image reprojection algorithm. The at least one image reprojection algorithm comprises at least one space warping algorithm.

Optionally, upon applying requisite corrections, the at least one processor is further configured to send the given first image and the given second image to the display apparatus, for displaying thereat. It will be appreciated that the aforesaid images are received by the display apparatus in real time or near-real time (i.e., without any latency/delay). Optionally, in this regard, prior to sending the given first image and the given second image, the at least one processor is configured to superimpose at least one virtual object upon the given first image and the given second image, for generating a given first XR image and a given second XR image, respectively. The given first XR image and the given second XR image are to be displayed via the at least one first light source and the at least one second light source, respectively. The given first XR image is a view of an XR scene from a perspective of the first eye of the user, whereas the given second XR image is a view of an XR scene from a perspective of the second eye of the user. The first XR image and the second XR image constitute a stereo XR image pair for the user's eyes.

Throughout the present disclosure, the term "light source" refers to an element from which light emanates. A given light source is driven to display image(s) upon correction. Optionally, a given light source is implemented as a display. In this regard, a given image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, a given image is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector.

The present disclosure also relates to the method as described above. Various embodiments and variants disclosed above, with respect to the aforementioned first aspect, apply mutatis mutandis to the method.

Optionally, the method further comprises:
obtaining information indicative of a dominant eye of the user or determining the dominant eye from amongst the first eye and the second eye;
determining an optical depth at which the user is looking; and
when the optical depth is greater than a predefined threshold depth and a given camera that captured the one of the given first image and the given second image corresponds to the dominant eye of the user, applying the motion blur correction to the one of the given first image and the given second image.

Optionally, the method further comprises:
determining an optical depth at which the user is looking; and
when the optical depth is not greater than a predefined threshold depth, applying the motion blur correction to any one of the given first image and the given second image randomly.

Alternatively, optionally, the method further comprises:
determining an optical depth at which the user is looking; and
when the optical depth is not greater than a predefined threshold depth, applying the motion blur correction to the sequence of first images.

Yet alternatively, optionally, the method further comprises:
determining an optical depth at which the user is looking; and
when the optical depth is not greater than a predefined threshold depth, applying the motion blur correction and the at least one of: defocus blur correction, image sharpening, contrast enhancement, edge enhancement in an alternating manner to the first images and the second images.

Optionally, the method further comprises:
obtaining information indicative of a dominant eye of the user or determining the dominant eye from amongst the first eye and the second eye; and
applying the at least one of: defocus blur correction, image sharpening, contrast enhancement, edge enhancement to the one of the given first image and the given second image, when a given camera that captured the one of the given first image and the given second image corresponds to the dominant eye of the user.

Optionally, the method further comprises employing a super-resolution technique for a given camera that captured the one of the given first image and the given second image. Additionally, optionally, the method further comprises employing the super-resolution technique in the gaze region of the another of the given first image and the given second image, for a given camera that captured the another of the given first image and the given second image.

Optionally, the method further comprises:
comparing the given first image with the given second image, after said correction is applied, for determining a difference in contrast between the given first image and the given second image;
when the difference in contrast is lower than a predefined threshold difference, reducing an extent of the motion blur correction that is applied to the one of the given first image and the given second image, or undoing application of the motion blur correction to the one of the given first image and the given second image.

Optionally, the method further comprises when the difference in contrast is not lower than the predefined threshold difference, applying the motion blur correction to a gaze region of the another of the given first image and the given second image also, wherein the gaze region corresponds to a gaze direction of the user.

The present disclosure also relates to the display apparatus as described above. Various embodiments and variants disclosed above, with respect to the aforementioned first aspect, apply mutatis mutandis to the display apparatus.

Notably, the at least one processor controls an overall operation of the display apparatus. The at least one processor is communicably coupled to at least the first camera, the second camera, the at least one first light source and the at least one second light source wirelessly and/or in a wired manner.

DETAILED DESCRIPTION OF THE DRAWINGS

Figure 1:
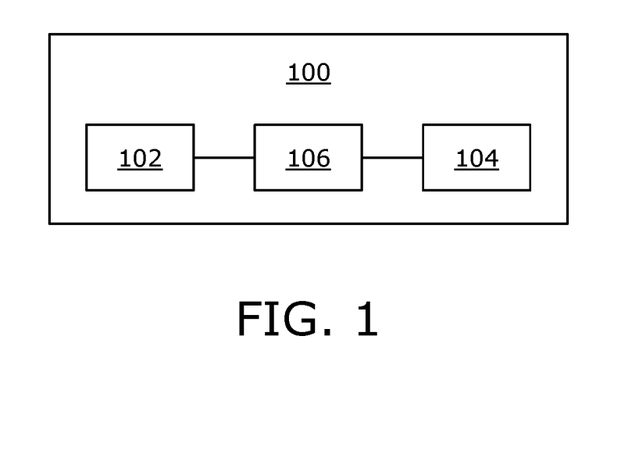
FIG. 1 illustrates a block diagram of an architecture of an imaging system incorporating different image corrections for different eyes, in accordance with an embodiment of the present disclosure.

Referring to FIG. 1, illustrated is a block diagram of an architecture of an imaging system 100 incorporating different image corrections for different eyes, in accordance with an embodiment of the present disclosure. The imaging system 100 comprises a first camera 102, a second camera 104, and at least one processor (depicted as a processor 106). The first camera 102 and the second camera 104 correspond to a first eye and a second eye of a user, respectively. The processor 106 is communicably coupled to the first camera 102 and the second camera 104.

It may be understood by a person skilled in the art that the FIG. 1 includes a simplified architecture of the imaging system 100 for sake of clarity, which should not unduly limit the scope of the claims herein. It is to be understood that the specific implementations of the imaging system 100 are provided as examples and are not to be construed as limiting it to specific numbers or types of cameras. The person skilled in the art will recognize many variations, alternatives, and modifications of embodiments of the present disclosure. For example, the imaging system 100 may comprise more than one first camera and more than one second camera.

Figure 2:
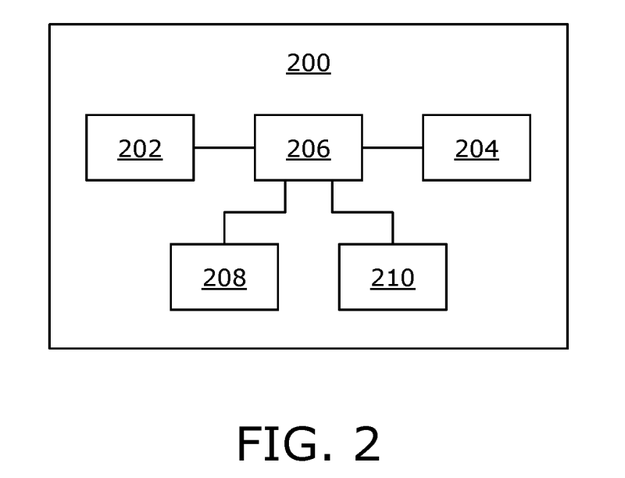
FIG. 2 illustrates a block diagram of an architecture of a display apparatus incorporating different image corrections for different eyes, in accordance with an embodiment of the present disclosure.

Referring to FIG. 2, illustrated is a block diagram of an architecture of a display apparatus 200 incorporating different image corrections for different eyes, in accordance with an embodiment of the present disclosure. The display apparatus 200 comprises a first camera 202, a second camera 204, at least one processor (depicted as a processor 206), at least one first light source and at least one second light source (depicted as a first light source 208 for a first eye and a second light source 210 for a second eye of a user). The first camera 202 and the second camera 204 correspond to the first eye and the second eye of the user, respectively. The processor 206 is communicably coupled to the first camera 202, the second camera 204, the first light source 208 and the second light source 210.

It may be understood by a person skilled in the art that the FIG. 2 includes a simplified architecture of the display apparatus 200 for sake of clarity, which should not unduly limit the scope of the claims herein. It is to be understood that the specific implementations of the display apparatus 200 are provided as examples and are not to be construed as limiting it to specific numbers or types of cameras, and to specific numbers or types of light sources. The person skilled in the art will recognize many variations, alternatives, and modifications of embodiments of the present disclosure. For example, the display apparatus 200 may comprise more than one first camera and more than one second camera.

Figure 3:
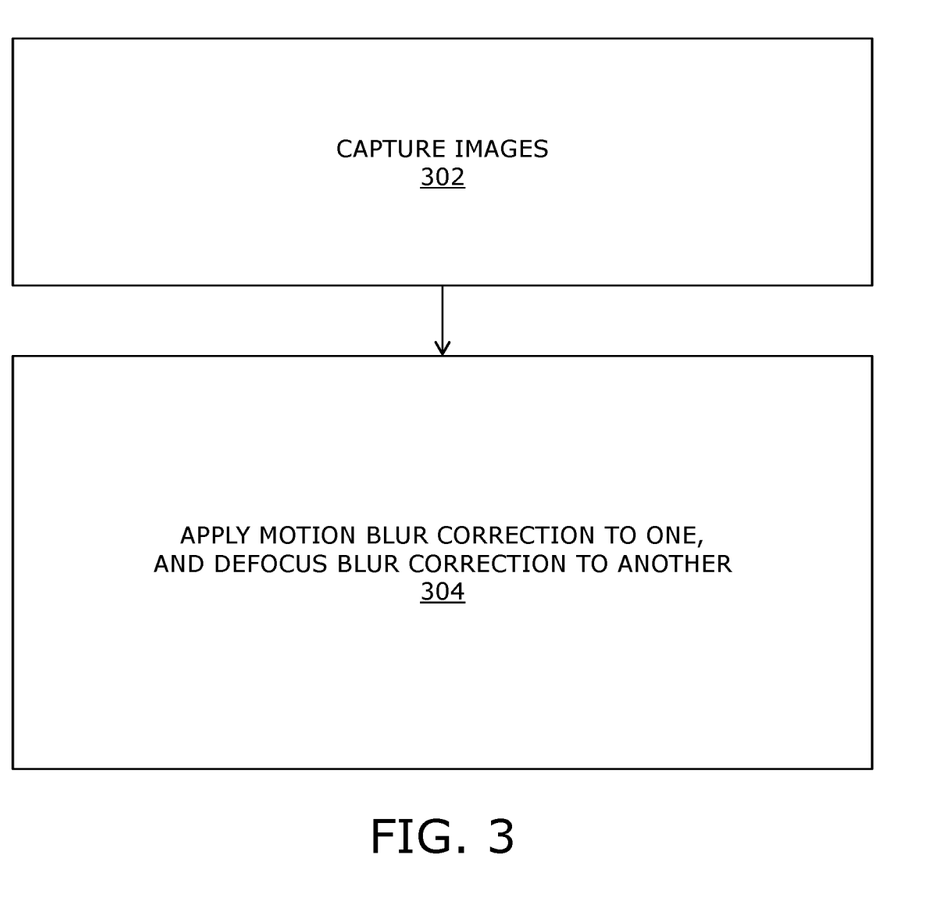
FIG. 3 illustrates steps of a method incorporating different image corrections for different eyes, in accordance with an embodiment of the present disclosure.

Referring to FIG. 3, illustrated are steps of a method incorporating different image corrections for different eyes, in accordance with an embodiment of the present disclosure. At step 302, a first camera and a second camera are controlled to capture a sequence of first images and a sequence of second images, respectively, wherein the first camera and the second camera correspond to a first eye and a second eye of a user, respectively. At step 304, motion blur correction is applied to one of a given first image and a given second image, whilst at least one of: defocus blur correction, image sharpening, contrast enhancement, edge enhancement is applied to another of the given first image and the given second image.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system comprising:
   a first camera and a second camera for capturing a sequence of first images and a sequence of second images with respect to a perspective of first eye and a second eye of a user, respectively; and
   at least one processor operatively coupled to the first camera and the second camera, the processor configured to:
      control the first camera and the second camera to capture the sequence of first images and the sequence of second images, respectively;
      determine an optical depth at which the user is looking;
      obtain information indicative of a dominant eye of the user or determine the dominant eye from amongst the first eye and the second eye;
      when the optical depth is greater than a predefined threshold depth and a given camera that captured one of the given first image or the given second image corresponds to the dominant eye of the user, apply motion blur correction to the one of the given first image or the given second image; and
      apply at least one of: defocus blur correction, image sharpening, contrast enhancement, or edge enhancement to an other of the given first image and the given second image.

2. The imaging system of claim 1, wherein the at least one processor is configured to:
   determine an optical depth at which the user is looking; and
   when the optical depth is not greater than a predefined threshold depth, apply the motion blur correction to any one of the given first image and the given second image randomly.

3. The imaging system of claim 1, wherein the at least one processor is configured to:
   determine an optical depth at which the user is looking; and
   when the optical depth is not greater than a predefined threshold depth, apply the motion blur correction to the sequence of first images.

4. The imaging system of claim 1, wherein the at least one processor is configured to:
   determine an optical depth at which the user is looking; and
   when the optical depth is not greater than a predefined threshold depth, apply the motion blur correction and the at least one of: defocus blur correction, image sharpening, contrast enhancement, edge enhancement in an alternating manner to the first images and the second images.

5. The imaging system of claim 1, wherein the at least one processor is configured to:
   obtain information indicative of a dominant eye of the user or determine the dominant eye from amongst the first eye and the second eye; and
   apply the at least one of: defocus blur correction, image sharpening, contrast enhancement, edge enhancement to the one of the given first image and the given second image, when a given camera that captured the one of the given first image and the given second image corresponds to the dominant eye of the user.

6. The imaging system of claim 1, wherein the at least one processor is configured to employ a super-resolution technique for a given camera that captured the one of the given first image and the given second image.

7. An imaging system comprising:
   a first camera and a second camera for capturing a sequence of first images and a sequence of second images with respect to a perspective of first eye and a second eye of a user, respectively; and
   at least one processor operatively coupled to the first camera and the second camera, the processor configured to:
      control the first camera and the second camera to capture the sequence of first images and the sequence of second images, respectively;
      determine an optical depth at which the user is looking;

obtain information indicative of a dominant eye of the user or determine the dominant eye from amongst the first eye and the second eye;

when the optical depth is greater than a predefined threshold depth and a given camera that captured one of the given first image or the given second image corresponds to the dominant eye of the user, apply motion blur correction to the one of the given first image or the given second image;

apply at least one of: defocus blur correction, image sharpening, contrast enhancement, or edge enhancement to an other of the given first image and the given second image;

compare the given first image with the given second image, after said correction is applied, to determine a difference in contrast between the given first image and the given second image; and when the difference in contrast is lower than a predefined threshold difference, reduce an extent of the motion blur correction that is applied to the one of the given first image and the given second image, or undo application of the motion blur correction to the one of the given first image and the given second image.

8. The imaging system of claim 7, wherein when the difference in contrast is not lower than the predefined threshold difference, the at least one processor is configured to apply the motion blur correction to a gaze region of the another of the given first image and the given second image also, wherein the gaze region corresponds to a gaze direction of the user.

9. The imaging system of claim 1, wherein the at least one processor is configured to employ a super-resolution technique in a gaze region of the other of the given first image and the given second image, for a given camera that captured the other of the given first image and the given second image.

10. A method comprising:
controlling a first camera and a second camera to capture a sequence of first images and a sequence of second images with respect to a perspective of first eye and a second eye of a user, respectively;
determining an optical depth at which the user is looking;
obtaining information indicative of a dominant eye of the user or determining the dominant eye from amongst the first eye and the second eye;
when the optical depth is greater than a predefined threshold depth and a given camera that captured one of the first images or the second images corresponds to the dominant eye of the user;
applying motion blur correction to the one of the given first image or the given second image; and
applying at least one of: defocus blur correction, image sharpening, contrast enhancement, or edge enhancement to an other of the given first image and the given second image.

11. The method of claim 10, further comprising:
determining an optical depth at which the user is looking; and
when the optical depth is not greater than a predefined threshold depth, applying the motion blur correction to any one of the given first image and the given second image randomly.

12. The method of claim 10, further comprising:
determining an optical depth at which the user is looking; and
when the optical depth is not greater than a predefined threshold depth, applying the motion blur correction to the sequence of first images.

13. The method of claim 10, further comprising:
determining an optical depth at which the user is looking; and
when the optical depth is not greater than a predefined threshold depth, applying the motion blur correction and the at least one of: defocus blur correction, image sharpening, contrast enhancement, edge enhancement in an alternating manner to the first images and the second images.

14. The method of claim 10, further comprising:
obtaining information indicative of a dominant eye of the user or determining the dominant eye from amongst the first eye and the second eye; and
applying the at least one of: defocus blur correction, image sharpening, contrast enhancement, edge enhancement to the one of the given first image and the given second image, when a given camera that captured the one of the given first image and the given second image corresponds to the dominant eye of the user.

15. The method of claim 10, further comprising employing a super-resolution technique for a given camera that captured the one of the given first image and the given second image.

16. A method comprising:
controlling a first camera and a second camera to capture a sequence of first images and a sequence of second images with respect to a perspective of first eye and a second eye of a user, respectively;
determining an optical depth at which the user is looking;
obtaining information indicative of a dominant eye of the user or determining the dominant eye from amongst the first eye and the second eye;
when the optical depth is greater than a predefined threshold depth and a given camera that captured one of the first images or the second images corresponds to the dominant eye of the user;
applying motion blur correction to the one of the given first image or the given second image; and
applying at least one of: defocus blur correction, image sharpening, contrast enhancement, or edge enhancement to an other of the given first image and the given second image;
the method further comprising:
comparing the given first image with the given second image, after said correction is applied, for determining a difference in contrast between the given first image and the given second image; and
when the difference in contrast is lower than a predefined threshold difference, reducing an extent of the motion blur correction that is applied to the one of the given first image and the given second image, or undoing application of the motion blur correction to the one of the given first image and the given second image.

17. The method of claim 16, further comprising when the difference in contrast is not lower than the predefined threshold difference, applying the motion blur correction to a gaze region of the another of the given first image and the given second image also, wherein the gaze region corresponds to a gaze direction of the user.

18. The method of claim 10, further comprising employing a super-resolution technique in a gaze region of the another of the given first image and the given second image, for a given camera that captured the another of the given first image and the given second image.

19. A display apparatus implementing the imaging system of claim 1, comprising at least one first light source and at least one second light source corresponding to the first eye and the second eye, respectively, wherein the at least one processor is configured to display the given first image and the given second image, via the at least one first light source and the at least one second light source, respectively.

* * * * *